Oct. 25, 1938.   C. A. CHRISTENSEN   2,134,072
POWER CHAMBER
Filed Oct. 9, 1936

INVENTOR.
CLARENCE A. CHRISTENSEN
BY
ATTORNEYS.

Patented Oct. 25, 1938

2,134,072

UNITED STATES PATENT OFFICE 2,134,072

POWER CHAMBER

Clarence A. Christensen, San Francisco, Calif., assignor, by mesne assignments, to William J. Besler Application October 9, 1936, Serial No. 104,826

6 Claims. (Cl. 308—4)

My invention relates to improvements in power chambers.

One of the objects of my invention is to provide a power chamber having a flexible mounted rod bushing to compensate for misalignment or distortion during operation.

Another object of my invention is to provide a power chamber of the type having a flexible diaphragm whereby the diaphragm supporting plate may be moved closer to one side of the housing than the other without binding the pull rod.

Another object of my invention is to provide a novel arrangement of the piston, shell and power chamber, including a flexible packing means for the pull rod.

Another object of my invention is to provide a pull rod sealing means for use in a power chamber of the type closed on both sides of the actuating member.

Other objects and advantages of my invention will appear from the following description, taken in connection with the drawing, in which.

Figure 1:
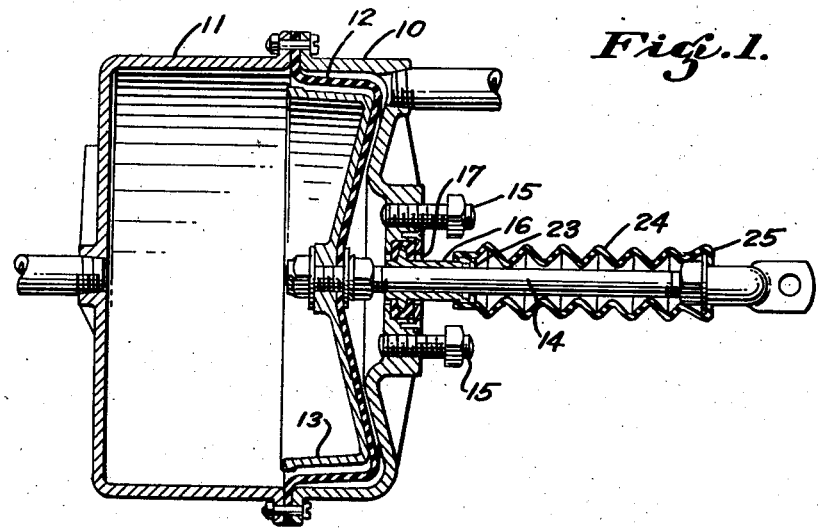
Fig. 1 is a cross-sectional view of one form of my device.

Referring to the drawing, the power chamber consists of a shell made up of two sections 10 and 11, which have clamped between them and adjacent the flanged ends the diaphragm 12, which, in conjunction with a drum-like member 13 constitute the power piston. The piston rod 14 is suitably secured in the piston, passing through both the diaphragm 12 and the cylindrical rigid member 13, and having suitable means for clamping the diaphragm 12 to the drum 13, at the central point thereof in an air-tight manner. The shell 10 has a relatively large central aperture through which the piston rod extends and it also is provided with large bosses, in which are threaded the studs 15, adapted to receive suitable bars or braces for securing the drum in position on the vehicle. Immediately surrounding the rod 14 is the closely fitting bushing 16, through which the rod 14 slides. The power chamber casing provides an aperture 17, of materially larger size than the bushing 16 which enables the bushing to swing around within a limited orbit relative to the end of the power chamber (see Fig. 2). The end plate on the chamber has an annular recess 18 into which fits a packing ring 20 which is U-shaped in cross-section, and adapted to receive the tapered annular ring 21 integral with and extending from the main bushing 16. An annular plate 22 (see Fig. 3), is secured to the end plate 10 of the power chamber and clamps the packing ring 20 in position and into tight engagement with the end plate of the power chamber and the annular flange 21 of the bushing. The packing ring 20 is made of rubber or other resilient fibrous material suitable for the particular purpose.

The outer end of the bushing 16 is provided with an annular flange 23, to which is attached a flexible dust cover 24 extending bellows-like over the rod 14 and secured at its outer end 25 to the rod 14. It will be apparent that the construction described provides a very tight fluid seal but at the same time permits the rod 14 to assume positions out of alignment with the axis of the power chamber and the piston 13. This is a very valuable function in a power chamber designed for the purposes of an automotive brake means.

A great variety of conditions are encountered in applying these vacuum brakes to vehicles, it frequently happening that the power chamber must be mounted or secured in a position in which the axis of the power chamber does not exactly correspond with the direction of application of power through the piston rod. In fact, this is, in most cases, unavoidably true and by reason of the fact that the mountings are improvised after the vehicle has been constructed and there is no easy manner of providing or determining when the mounting for the chamber establishes it in exact alignment with the direction of the piston rod. Furthermore, the frame members of vehicles and the brake operating mechanism is usually of such a construction as to present frequent distortions and changes of line of movement during operation.

Figure 2:
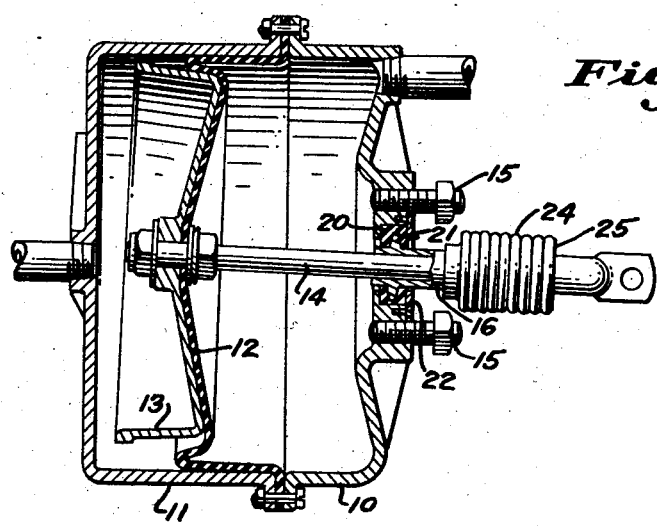
Fig. 2 is a cross-sectional view of the same device showing the chamber partially energized and with the pull rod deflected.
Figure 3:
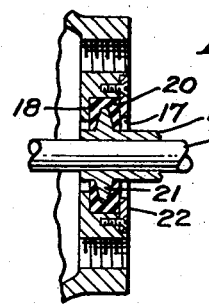
Fig. 3 is an enlarged view of one form of the flexible mounting means.

Referring to Fig. 2, for example, it will be seen, that the piston rod 14 has been pulled down out of a straight position due to misalignment of the brake rods. This condition is unavoidable as the brake rod usually swings in an arc preventing straight line movement of the outer end of rod 14. Side shifting of the arm 14 is also likely to occur. The present power chamber is remarkably adapted to operate under such conditions and without destruction of the fluid seal where the rod must pass through the housing.

While I have shown and described one form of my device, I wish it distinctly understood that I do not thereby intend to limit myself to this one construction, as I am aware that an engineer in the designing of a structure to accomplish the purpose of my invention may vary the proportions of the parts, and method of attachment, etc., and still retain the inventive thought behind my invention.

What I claim is:

1. A double acting power chamber of the type employing a flexible diaphragm, comprising a pair of hollow cup-like sections, a flexible diaphragm secured within said sections to provide a chamber on each side of said diaphragm, a pull rod projecting into one of said chambers through an opening in the cup member forming one wall thereof, said rod being secured to the diaphragm in said chamber, means for sealing the opening in the cup member between it and the pull rod comprising a bushing provided with a tapered external ring slidable on said pull rod, and a flexible member adapted to receive said ring secured to said bushing and to said housing bore, whereby said pull rod is adjustably supported in position to permit of its being deflected from a straight line during operation of said power unit.

2. A double acting power chamber of the type employing a flexible diaphragm, comprising a pair of hollow cup-like sections, a flexible diaphragm secured within said sections to provide a chamber on each side of said diaphragm, a pull rod projecting into one of said chambers through an opening in the cup member forming one wall thereof, said rod being secured to the diaphragm in said chamber, means for sealing the opening in the cup member between it and the pull rod comprising a collar slidable on said pull rod, a rim on said collar, a U-shaped resilient member fitted around said collar and rim and secured to said housing in a leak-tight joint, thereby supporting said pull rod in said housing with a floating mounting.

3. A diaphragm type power chamber adapted for actuation in both directions, comprising a pair of cup-shaped members having meeting flanges for securing them together, a flexible diaphragm secured at its periphery between said flanges, a pull rod secured to said diaphragm and projecting through a hole in one of said cup-like housing members, a bushing provided with an external ring slidable on said pull rod, a resilient member grooved to receive said ring surrounding said bushing and ring, and means for securing said resilient member in a leak-tight fit with one of the walls adjacent the opening in said cup-member.

4. A power chamber of the fluid pressure type comprising a housing, a flexible diaphragm secured at its edges within said housing, a pull rod extending through an opening in said housing and having one end secured to said diaphragm, a bushing through which said rod is slidable, and resilient means carried by said housing to secure said bushing in said opening, whereby said pull rod bushing is self-aligning.

5. A power chamber of the fluid pressure type comprising a housing, a flexible diaphragm secured at its edges within said housing, a pull rod extending through an opening in said housing and having one end secured to said diaphragm, a shouldered recess in said housing surrounding said opening, a bushing through which said rod is slidable, a flange on said bushing, and flexible sealing means secured in said shouldered recess and engaging the flange on said bushing, whereby the latter adjusts itself to the alignment of said pull rod.

6. A pull rod mounting device for a fluid pressure servo motor of the diaphragm power chamber type, comprising a bushing through which said rod is slidable, a flange on said bushing, a resilient member provided with a recess to receive said flange, and means to secure said resilient member to said power chamber, thereby supporting said pull rod in a floating mounting.

CLARENCE A. CHRISTENSEN.